Nov. 16, 1926.  
A. G. ANDERSON  
1,607,145  
FASTENER  
Filed Jan. 22, 1924
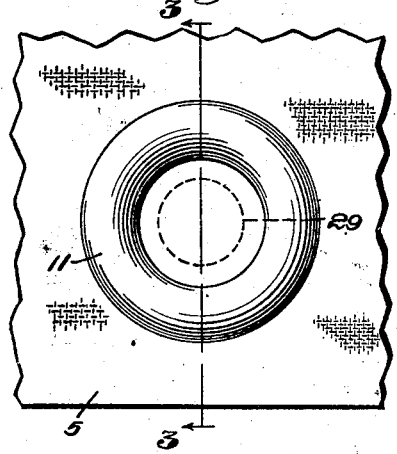
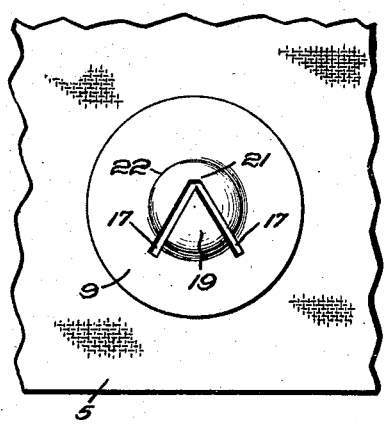
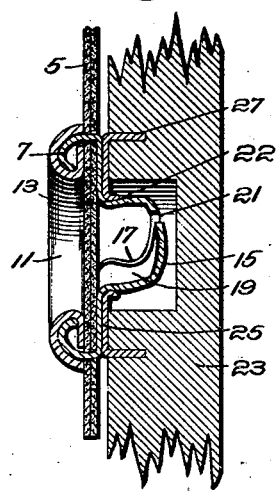
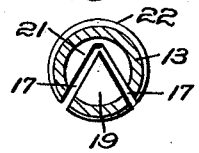
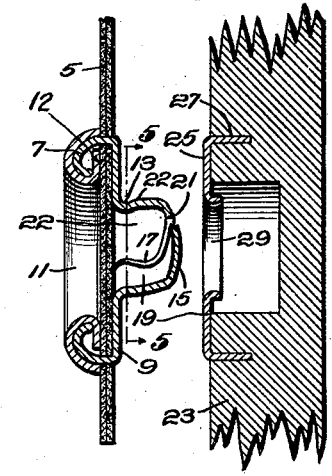
Inventor:
Andrew G. Anderson Patented Nov. 16, 1926.

1,607,145

UNITED STATES PATENT OFFICE.

ANDREW G. ANDERSON, OF QUINCY, MASSACHUSETTS, ASSIGNOR TO CARR FASTENER COMPANY, OF CAMBRIDGE, MASSACHUSETTS, A CORPORATION OF MAINE.

FASTENER.

Application filed January 22, 1924. Serial No. 687,729.

This invention aims to provide an improved fastener.

In the drawings, which show one illustrative embodiment of my invention:

Figure 1 is a front elevation of a fastener;

Fig. 2 is a front elevation of the stud;

Fig. 3 is a section on the line 3—3 of Fig. 1;

Fig. 4 is a section similar to Fig. 3, but showing the stud withdrawn from the socket; and Fig. 5 is a section on the line 5—5 of Fig. 4 showing the eccentricity of the head and neck of the stud.

In the preferred form of my invention selected for illustrative purposes, the stud is secured to a curtain 5 by prongs 7 projecting from the periphery of the base 9 of the stud and passing through the curtain into engagement with an annular attaching plate 11, which provides an inner surface serving as an anvil for deflecting the prongs 7 inwardly and downwardly into engagement with a clench flange 12.

The stud includes a neck 13 and a head 15 and a base 9, the stud made contractible and expansible by two preferably radial slots 17, 17 extending from the outer face of the head 15 of the stud through the neck, and preferably, as illustrated, extending sufficiently into the base to permit flexing of that portion at the bottom of the stud between said slots upon a straight line passing through the base of the stud between the ends of the slots 17, 17. That portion between these slots provides a resilient portion 19 of the stud, yieldable inwardly to permit separation of the stud and cooperating socket.

The stud illustrated thus provides two parts, an upper, or semi-rigid part 21, and a lower or resilient part 19.

The head 15 and neck 13 are preferably circular in cross-section, but the head is eccentric to the neck, the eccentricity of the head being in a direction away from the resilient part 19 so that the semi-rigid part 21 presents a shoulder 22 between the head and the neck at that side of the stud opposite the resilient portion, this shoulder gradually diminishing at the sides of the stud and disappearing or substantially disappearing at the resilient portion 19, as best illustrated in Fig. 5.

The socket 25 includes a number of prongs 27, spaced about the periphery thereof, and a stud-receiving aperture 29 having an unyielding wall for engagement with the neck 13 of the stud. This wall preferably, as illustrated, provides a stud-engaging surface substantially longer than the thickness of the metal from which the socket is pressed, thereby presenting a substantial bearing surface for contact with the neck of the stud.

When the stud and socket are engaged, the base of the stud lies closely adjacent the face of the socket so as to bring the plane of the curtain as close as possible to the body 23 of the car. Thus the strain produced by an upward pull on the curtain is brought so close to the outer line or point of contact between the stud and its socket that the resolution of forces will not cause the stud to pivot about this line or point of contact and produce a tipping moment effecting undesired separation of the stud from the socket. There can be no separation of the stud from the socket by an outward strain exerted on the curtain above the stud, or on the side thereof above the center of the stud, because the shoulder 22 located upon the semi-rigid part 21 is engaged behind the wall of the stud-receiving aperture 29. The shoulder providing portion 21 of the stud, being semi-rigid, cannot contract to permit disengagement of the head 19 from the socket when outward strain is exerted upon that part of the stud. Thus I have provided a three-side lock fastener which includes a stud locked against separation from a socket by a pull at any side of the fastener adjacent that portion of the stud which engages behind the wall surrounding the stud-receiving aperture. The stud may, however, be separated from the socket by an outward pull upon that edge of the curtain adjacent the resilient part 19. This action causes contraction of the head of the stud by collapsing or inward movement of the resilient portion 19, which preferably presents a surface curving outwardly and upwardly from the neck of the stud which acts as a camming surface against the adjacent wall of the socket and allows disengagement of the stud from the socket by a tipping action.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A separable fastener including a socket adapted to be secured to a rigid socket-carrying part and presenting a stud-receiving aperture, in combination with a stud adapted to be secured to a flexible stud-carrying fabric, said stud including a head, a neck and a base portion and having two intersecting slots extending from the outer face of said head a substantial distance into said base portion to provide a substantially semi-rigid portion and a resilient portion, said resilient portion being located at the bottom of the stud between the slots, said head providing a shoulder on the semi-rigid portion to oppose separation of said stud from said socket by outward strain at that side of the fastener adjacent said shoulder, said neck relatively close to said base portion to permit the flexible stud-carrying fabric to lie relatively close to the plane of said stud-receiving aperture, thereby to oppose separation of said stud from said socket by the resolution of forces arising from strain on said fabric at that side of said stud which presents said shoulder.

2. A stud for a three-side lock fastener comprising a neck, a head eccentric relative to said neck and a plurality of slots located in said head, said slots providing a resilient stud part and a semi-rigid stud part, a shoulder on said semi-rigid stud part to engage behind a portion of the wall of a suitable socket, said stud separable from the socket by an outward pull at that side of said stud adjacent said resilient part.

3. A stud for a three-side lock fastener comprising a neck, a head eccentric relative to said neck and a plurality of generally radially disposed slots located in said head, said slots providing a resilient stud part and a semi-rigid stud part, a shoulder on said rigid stud part to engage behind a portion of the wall of a suitable socket, said stud separable from the socket by an outward pull at that side of said stud adjacent said resilient part.

4. A three-side lock fastener comprising, in combination, a socket presenting a stud-receiving aperture having a continuous non-resilient peripheral wall, a cooperating stud including a head, a neck and a base portion, said stud divided by a plurality of generally radially disposed slots into a semi-rigid upper portion and a resilient lower portion, said head eccentric relative to said neck to provide a shoulder upon said rigid portion, said shoulder and semi-rigid portion acting to prevent separation of said stud from said socket by a strain on three sides thereof while said resilient portion may contract to permit separation of the neck of said stud from engagement with said wall by a separating strain between the stud and socket at that side adjacent said resilient portion.

5. A curtain fastener comprising, in combination, a socket presenting a stud-receiving aperture having a rigid stud-engaging inner wall, a cooperating stud for engagement in said aperture, said stud comprising a head, a neck, a semi-rigid shouldered portion extending on three sides thereof and a resilient portion independently of the semi-rigid portion and provided at the fourth side, said stud and socket separable by a pull on the curtain at the side where said resilient part is located.

6. A stud for separable fasteners including a head and neck portion, having a resilient portion of substantial width at one side of the stud to contract and expand when the stud is being engaged in or disengaged from a socket, the remainder of the stud being separate from the resilient portion by diverging slots to provide a semi-rigid portion for the other three sides, said rigid portion presenting a shoulder for engagement behind the stud-engaging wall of a cooperating socket, said shoulder locking said stud against separation from the socket by strain between the stud and socket at those sides adjacent the rigid portion of said stud.

In testimony whereof, I have signed my name to this specification.

ANDREW G. ANDERSON.

Certificate of Correction.

It is hereby certified that in Letters Patent No. 1,607,145, granted November 16, 1926, upon the application of Andrew G. Anderson, of Quincy, Massachusetts, for an improvement in "Fasteners," an error appears in the printed specification requiring correction as follows: Page 2, line 49, claim 3, for the word "rigid" read *semi-rigid;* and that the said Letters Patent should be read with this correction therein that the same may conform to the record of the case in the Patent Office.

Signed and sealed this 21st day of December, A. D. 1926.

[SEAL.]
M. J. MOORE,
*Acting Commissioner of Patents.*